US011792825B2

United States Patent
Abedini et al.

(10) Patent No.: US 11,792,825 B2
(45) Date of Patent: Oct. 17, 2023

(54) BROADCASTING INTENDED TIME DIVISION DUPLEX CONFIGURATIONS

(71) Applicant: QUALCOMM Incorporated, San Diego, CA (US)

(72) Inventors: Navid Abedini, Basking Ridge, NJ (US); Xipeng Zhu, San Diego, CA (US); Tao Luo, San Diego, CA (US); Luca Blessent, Whitehouse Station, NJ (US); Karl Georg Hampel, Hoboken, NJ (US); Jianghong Luo, Skillman, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 17/224,441

(22) Filed: Apr. 7, 2021

(65) Prior Publication Data
US 2021/0360585 A1  Nov. 18, 2021

Related U.S. Application Data

(60) Provisional application No. 63/023,513, filed on May 12, 2020.

(51) Int. Cl.
| | |
|---|---|
| *H04W 72/30* | (2023.01) |
| *H04L 5/14* | (2006.01) |
| *H04W 68/00* | (2009.01) |
| *H04W 72/0446* | (2023.01) |
| *H04W 72/23* | (2023.01) |

(52) U.S. Cl.
CPC ........... *H04W 72/30* (2023.01); *H04L 5/1469* (2013.01); *H04W 68/005* (2013.01); *H04W 72/0446* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 10,470,205 | B2 * | 11/2019 | Parkvall | H04W 72/1263 |
| 11,272,502 | B2 * | 3/2022 | Choi | H04L 5/14 |
| 11,412,528 | B2 * | 8/2022 | Choi | H04W 72/0453 |
| 11,496,276 | B2 * | 11/2022 | Zhou | H04B 7/01 |
| 2014/0133371 | A1 * | 5/2014 | Park | H04L 5/001 370/280 |
| 2017/0188357 | A1 * | 6/2017 | Visotsky | H04W 56/001 |

(Continued)

OTHER PUBLICATIONS

International Search Report and Written Opinion—PCT/US2021/026450—ISA/EPO—dated Jun. 24, 2021.

(Continued)

*Primary Examiner* — Bob A Phunkulh
(74) *Attorney, Agent, or Firm* — Harrity & Harrity, LLP

(57) ABSTRACT

Various aspects of the present disclosure generally relate to wireless communication. In some aspects, a child node may receive a message, from a serving or neighboring cell, that includes an indication of an intended time division duplex (TDD) configuration for the serving or neighboring cell. The indication may include downlink and uplink indicators for at least one slot used within the intended TDD configuration. Accordingly, the child node may determine a symbol to use within a TDD configuration for the child node, based at least in part on receiving the message. Numerous other aspects are provided.

30 Claims, 8 Drawing Sheets

(56) References Cited

U.S. PATENT DOCUMENTS

| | | | |
|---|---|---|---|
| 2019/0230689 A1* | 7/2019 | Cao | H04L 5/0094 |
| 2019/0335478 A1* | 10/2019 | Xiong | H04W 72/0446 |
| 2020/0029313 A1* | 1/2020 | Parkvall | H04W 72/1289 |
| 2020/0137736 A1* | 4/2020 | Du | H04L 5/0005 |
| 2020/0145993 A1 | 5/2020 | Abedini et al. | |
| 2020/0145994 A1 | 5/2020 | Luo et al. | |
| 2020/0220669 A1* | 7/2020 | Park | H04L 1/1896 |
| 2020/0229009 A1* | 7/2020 | Xu | H04B 17/318 |
| 2020/0229271 A1* | 7/2020 | You | H04W 56/001 |
| 2020/0305191 A1* | 9/2020 | Moon | H04W 72/1289 |
| 2020/0313743 A1* | 10/2020 | Park | H04L 5/0057 |
| 2020/0351919 A1* | 11/2020 | Oh | H04W 48/10 |
| 2020/0413457 A1* | 12/2020 | Hong | H04W 76/10 |
| 2021/0127356 A1* | 4/2021 | Agiwal | H04L 5/0053 |
| 2021/0168798 A1* | 6/2021 | Xu | H04L 5/0007 |
| 2021/0195587 A1* | 6/2021 | Kaikkonen | H04L 5/14 |
| 2021/0259051 A1* | 8/2021 | Latheef | H04W 40/22 |
| 2021/0289438 A1* | 9/2021 | Kim | H04W 48/14 |
| 2021/0345321 A1* | 11/2021 | Wu | H04W 88/14 |
| 2021/0377936 A1* | 12/2021 | Yuan | H04L 5/0094 |
| 2021/0400661 A1* | 12/2021 | Harada | H04W 72/042 |
| 2022/0007401 A1* | 1/2022 | Harada | H04W 28/20 |
| 2022/0029694 A1* | 1/2022 | Ishii | H04W 48/12 |
| 2022/0046672 A1* | 2/2022 | Yuan | H04L 5/0053 |
| 2022/0060247 A1* | 2/2022 | Harada | H04W 72/0426 |
| 2022/0060277 A1* | 2/2022 | Wei | H04L 5/0094 |
| 2022/0095144 A1* | 3/2022 | Ren | H04J 11/003 |
| 2022/0103294 A1* | 3/2022 | Ying | H04W 72/0446 |
| 2022/0124707 A1* | 4/2022 | Bae | H04W 72/0446 |
| 2022/0141749 A1* | 5/2022 | Luo | H04W 36/30 370/331 |
| 2022/0149965 A1* | 5/2022 | Werner | H04J 11/0023 |
| 2022/0158770 A1* | 5/2022 | Hong | H04L 1/18 |
| 2022/0167320 A1* | 5/2022 | Lee | H04L 5/0094 |
| 2022/0174692 A1* | 6/2022 | Panteleev | H04W 72/1263 |
| 2022/0191832 A1* | 6/2022 | Yokomakura | H04W 72/042 |
| 2022/0191882 A1* | 6/2022 | Lee | H04L 1/1864 |
| 2022/0191903 A1* | 6/2022 | Bae | H04W 72/042 |
| 2022/0217661 A1* | 7/2022 | Yokomakura | H04B 7/155 |
| 2022/0248410 A1* | 8/2022 | Lee | H04W 52/14 |

OTHER PUBLICATIONS

Qualcomm Incorporated: "IAB Resource Management Framework", 3GPP Draft, 3GPP TSG RAN WG1 Meeting AH1901, R1-1900881, IAB Resource Management Framework, Jan. 21, 2019, 8 pages, retrieved from http://www.3gpp.org/ftp/Meetings%5F3GPP%5FSYNC/RAN1/Docs/R1%2D1900881%2Ezip.

* cited by examiner

BROADCASTING INTENDED TIME DIVISION DUPLEX CONFIGURATIONS

CROSS-REFERENCE TO RELATED APPLICATION

This patent application claims priority to U.S. Provisional Patent Application No. 63/023,513, filed on May 12, 2020, entitled "INTENDED TIME DIVISION DUPLEX CONFIGURATION BROADCASTING," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for broadcasting intended time division duplex configurations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a child node, may include receiving a message, from a serving or neighboring cell, that includes an indication of an intended time division duplex (TDD) configuration for the serving or neighboring cell, wherein the indication includes downlink and uplink indicators for at least one slot used within the intended TDD configuration; and determining a symbol to use within a TDD configuration for the child node, based at least in part on receiving the message.

In some aspects, a method of wireless communication, performed by a parent node, may include generating a message to include an indication of an intended TDD configuration for the parent node, wherein the indication includes downlink and uplink indicators for at least one slot used within the intended TDD configuration; and transmitting the message including the indication of the intended TDD configuration for the parent node.

In some aspects, a child node for wireless communication may include a memory and one or more processors coupled to the memory. The memory and the one or more processors may be configured to receive a message, from a serving or neighboring cell, that includes an indication of an intended TDD configuration for the serving or neighboring cell, wherein the indication includes downlink and uplink indicators for at least one slot used within the intended TDD configuration; and determine a symbol to use within a TDD configuration for the child node, based at least in part on receiving the message.

In some aspects, a parent node for wireless communication may include a memory and one or more processors coupled to the memory. The memory and the one or more processors may be configured to generate a message to include an indication of an intended TDD configuration for the parent node, wherein the indication includes downlink and uplink indicators for at least one slot used within the intended TDD configuration; and transmit the message including the indication of the intended TDD configuration for the parent node.

In some aspects, a non-transitory computer-readable medium may store one or more instructions for wireless communication. The one or more instructions, when executed by one or more processors of a child node, may cause the child node to receive a message, from a serving or neighboring cell, that includes an indication of an intended TDD configuration for the serving or neighboring cell, wherein the indication includes downlink and uplink indicators for at least one slot used within the intended TDD configuration; and determine a symbol to use within a TDD configuration for the child node, based at least in part on receiving the message.

In some aspects, a non-transitory computer-readable medium may store one or more instructions for wireless communication. The one or more instructions, when executed by one or more processors of a parent node, may cause the parent node to generate a message to include an indication of an intended TDD configuration for the parent node, wherein the indication includes downlink and uplink indicators for at least one slot used within the intended TDD configuration; and transmit the message including the indication of the intended TDD configuration for the parent node.

In some aspects, an apparatus for wireless communication may include means for receiving a message, from a serving or neighboring cell, that includes an indication of an intended TDD configuration for the serving or neighboring cell, wherein the indication includes downlink and uplink indicators for at least one slot used within the intended TDD configuration; and means for determining a symbol to use within a TDD configuration for the apparatus, based at least in part on receiving the message.

In some aspects, an apparatus for wireless communication may include means for generating a message to include an indication of an intended TDD configuration for the apparatus, wherein the indication includes downlink and uplink indicators for at least one slot used within the intended TDD configuration; and means for transmitting the message including the indication of the intended TDD configuration for the apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
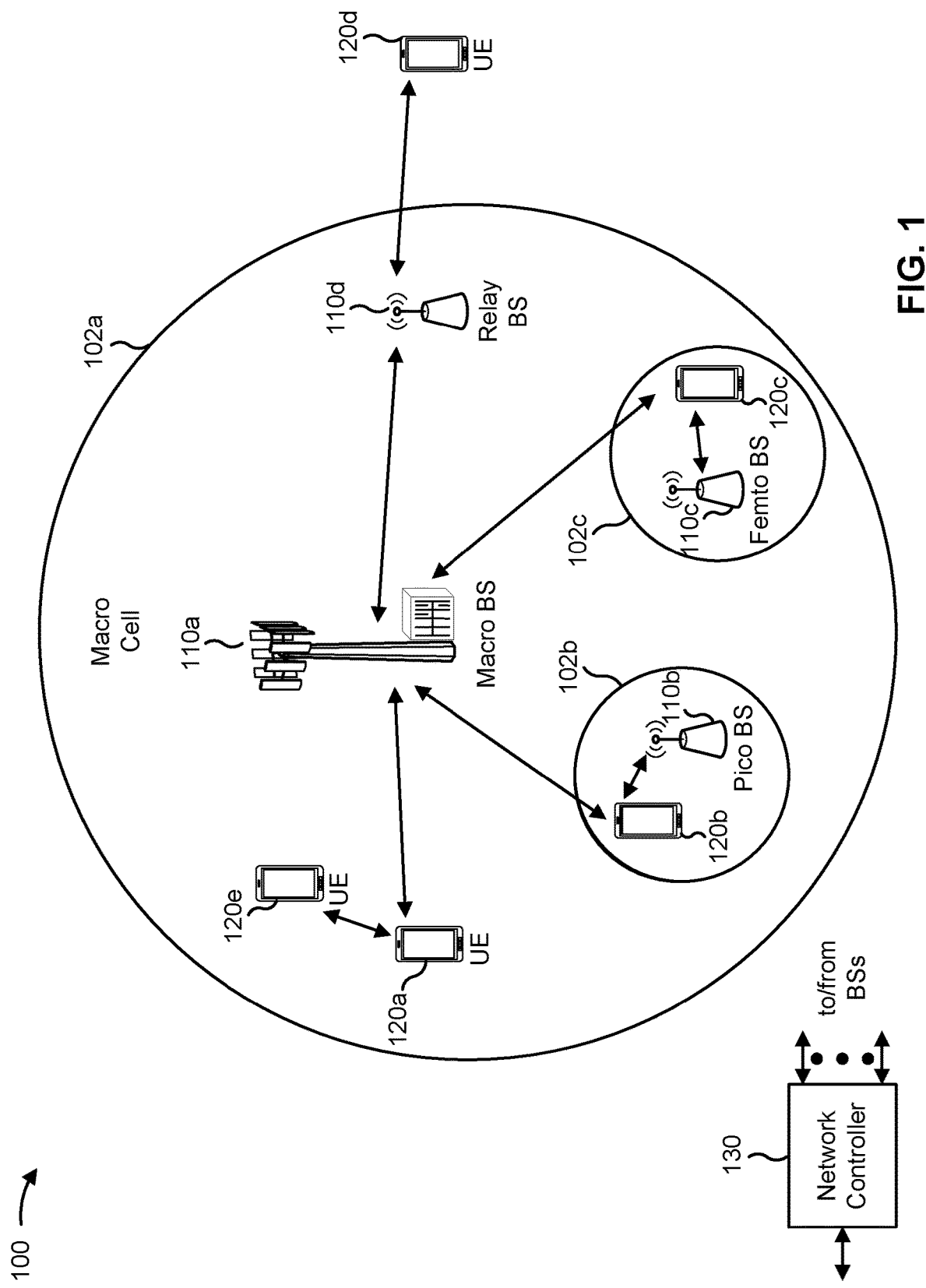
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
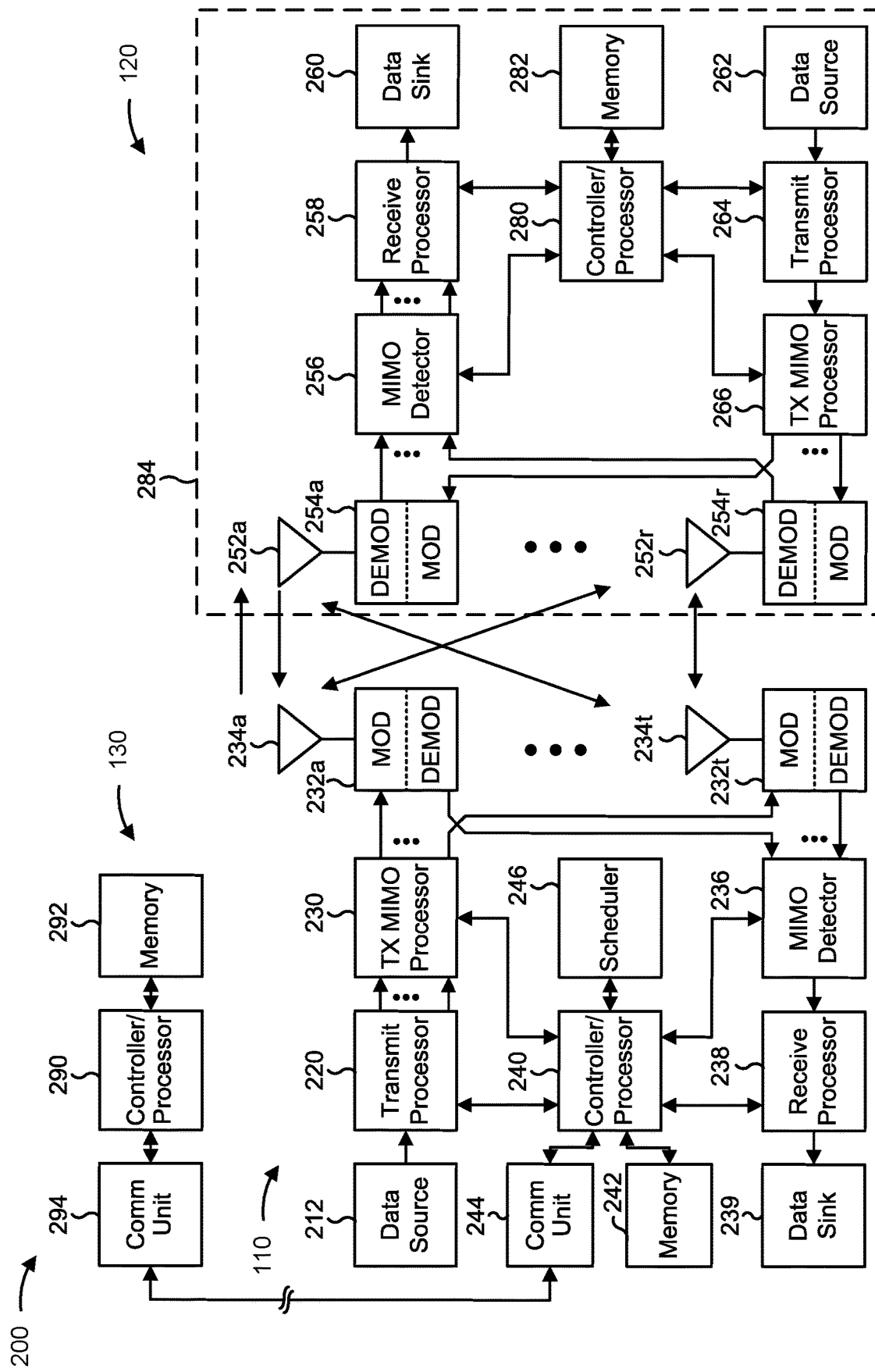
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 6-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 6-8).

Controller/processor 240 of base station 110, controller/processor 280 of UE 120, and/or any other component(s) of FIG. 2 may perform one or more techniques associated with broadcasting intended time division duplex (TDD) configurations, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples. In some aspects, a node as described herein is the base station 110, is included in the base station 110, or includes one or more components of the base station 110 shown in FIG. 2.

In some aspects, a child node (e.g., the base station 110 and/or child node 610 as described below in connection with FIG. 6) may include means for receiving a message, from a serving or neighboring cell, that includes an indication of an intended TDD configuration for the serving or neighboring cell, wherein the indication includes downlink and uplink indicators for at least one slot used within the intended TDD configuration; and/or means for determining a symbol to use within a TDD configuration for the child node, based at least in part on receiving the message. In some aspects, the means for the child node to perform operations described herein may include, for example, one or more of antenna 234, DEMOD 232, MIMO detector 236, receive processor 238, controller/processor 240, transmit processor 220, TX MIMO processor 230, MOD 232, antenna 234, memory 242, or scheduler 246.

In some aspects, the child node may further include means for receiving a paging message indicating a change to the intended TDD configuration; and means for determining the symbol to use based at least in part on receiving the paging message.

In some aspects, a parent node (e.g., the base station 110 and/or a parent node serving cell 605 as described below in connection with FIG. 6) may include means for generating a message to include an indication of an intended TDD configuration for the parent node, wherein the indication includes downlink and uplink indicators for at least one slot used within the intended TDD configuration; and/or means for transmitting the message including the indication of the intended TDD configuration for the parent node. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, memory 242, or scheduler 246.

In some aspects, the parent node may further include means for broadcasting the message as a system information block (SIB) message; and/or means for sending the message as downlink control information (DCI).

In some aspects, the parent node may further include means for generating a paging message indicating a change to the intended TDD configuration; and means for transmitting the paging message indicating the change to the intended TDD configuration.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
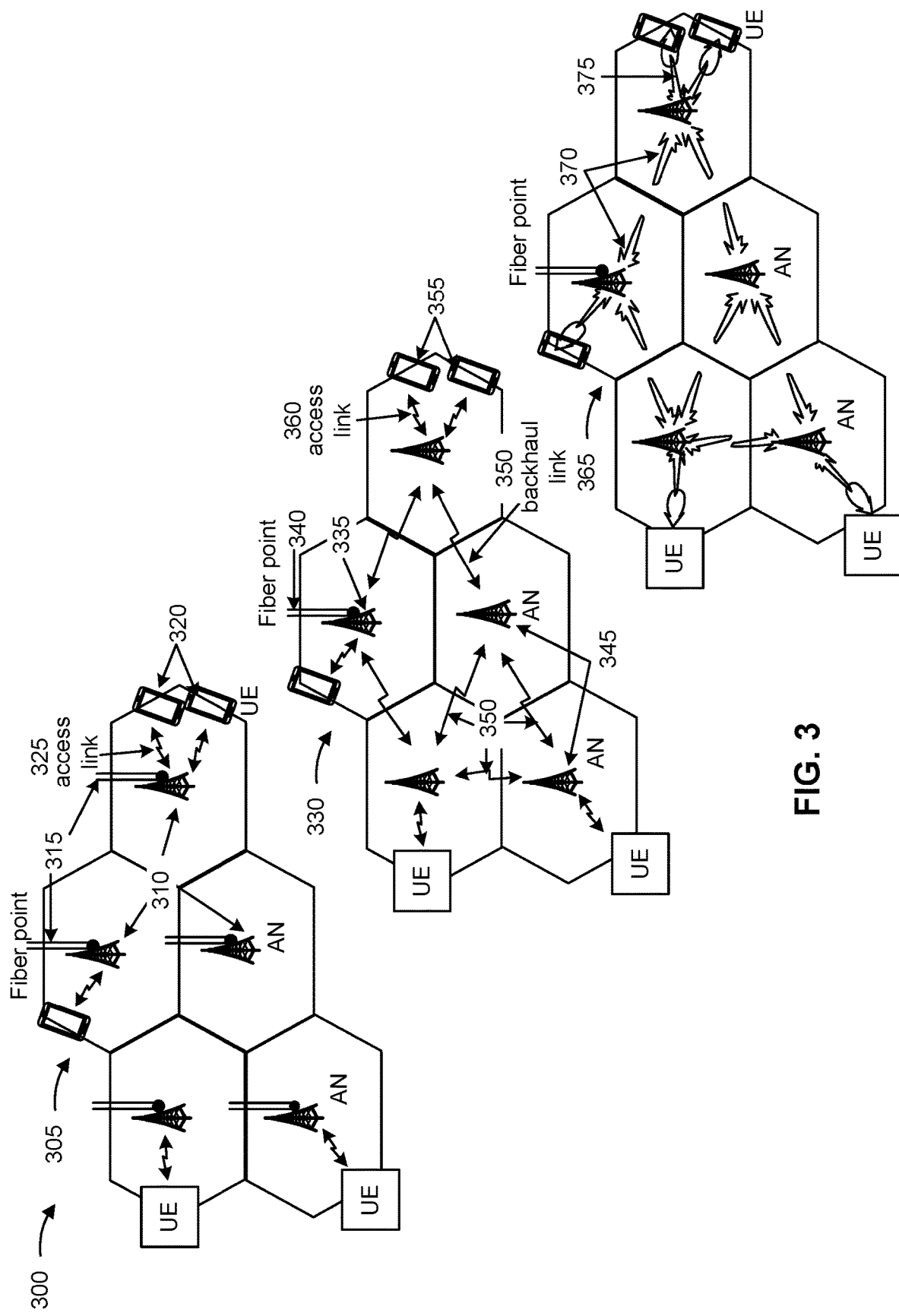
FIG. 3 is a diagram illustrating examples of radio access networks (RANs), in accordance with the present disclosure.

FIG. 3 is a diagram illustrating examples 300 of radio access networks, in accordance with the present disclosure. As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an TAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, "anchor node" may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
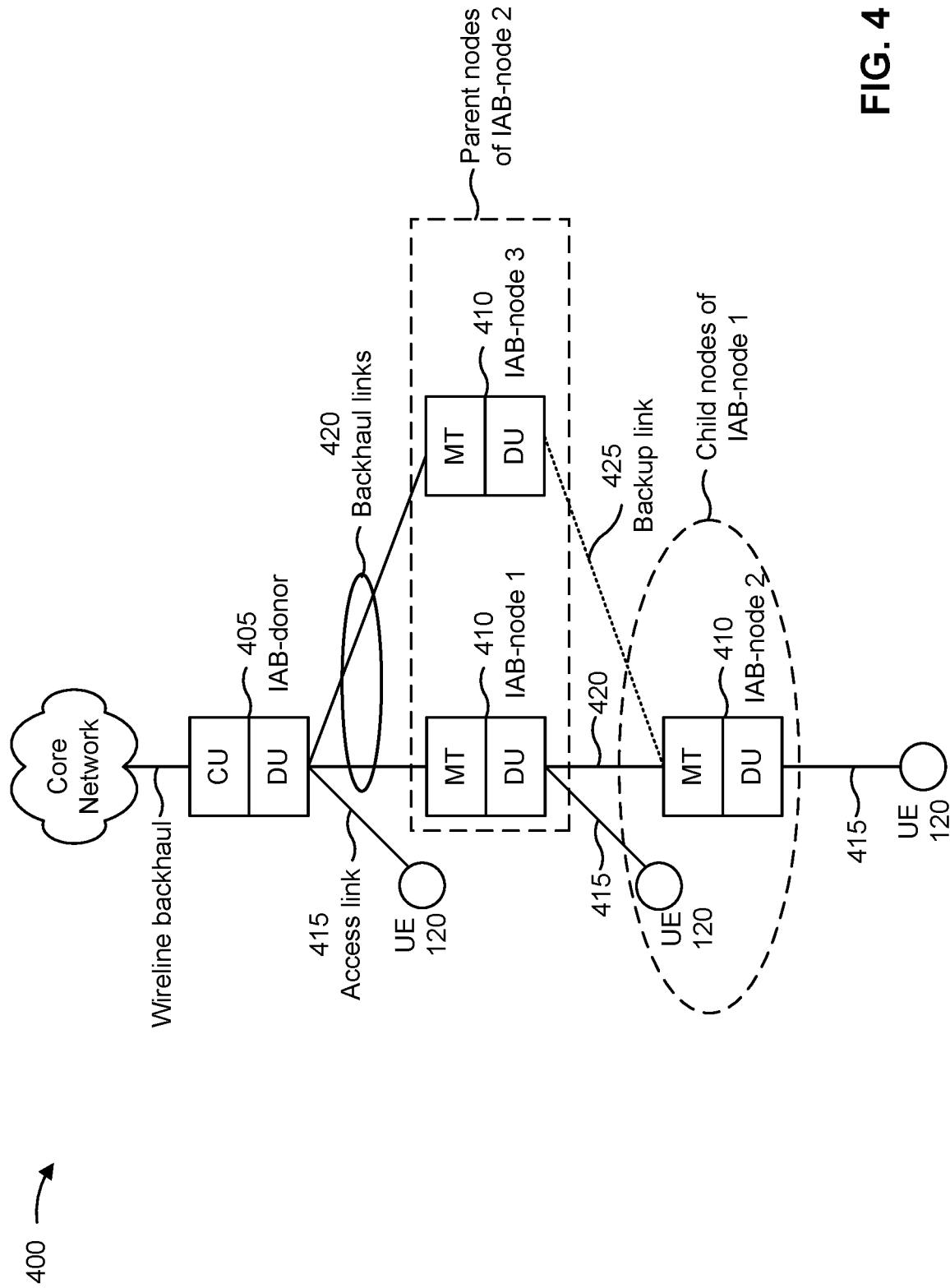
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the present disclosure. As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with 3. As shown, an IAB donor 405 may include a central unit (CU), which may perform access node controller (ANC) functions and/or AMF functions. The CU may configure a distributed unit (DU) of the IAB donor 405 and/or may configure one or more IAB nodes 410 (e.g., a mobile termination (MT) unit and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT unit may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

In an IAB network, parent nodes may inform child nodes about TDD configurations used within cells served by parent nodes. The child nodes may use the TDD configurations to manage interference, such as by selecting symbols for uplink and/or downlink that are not used by other child nodes and/or by using flexible symbols (e.g., as described below in connection with FIG. 5) for uplink and/or downlink based at least in part on how other child nodes are using the flexible symbols. However, if a parent DU seeks information about a TDD configuration used by a different parent DU (e.g., serving one or more cells that neighbor one or more cells served by the parent DU), such information is generally transmitted through one or more parent CUs of the parent DUs. For example, any information from a first parent DU to a second parent DU is transmitted to a parent CU of the first parent DU and then exchanged between the parent CU of the first parent DU and a parent CU of the second parent DU before being transmitted to the second parent DU. Additional transmissions are involved if a child DU or child MT is exchanging information with a parent DU of another cell or with a child DU or child MT of a different parent DU. These exchanges are slow and consume significant processing resources and network resources. Accordingly, both computing and network resources are expended to transfer information between parent DUs.

Techniques and apparatuses described herein allow parent DUs to broadcast TDD configurations to other DUs and/or MTs that are not children of the broadcasting DUs. Accordingly, DUs and/or MTs may adjust the TDD configurations used by the DUs and/or MTs, respectively, based at least in part on TDD configurations that are broadcast. These broadcasts are faster and consume fewer processing and network resources as compared with exchanging information through CUs, as described above. As a result, techniques and apparatuses described herein conserve computing resources and network resources when TDD configurations are exchanged (e.g., in order to manage interference).

As indicated above, FIG. 4 is provided as an example. Other examples may differ from what is described with regard to FIG. 4.

Figure 5:
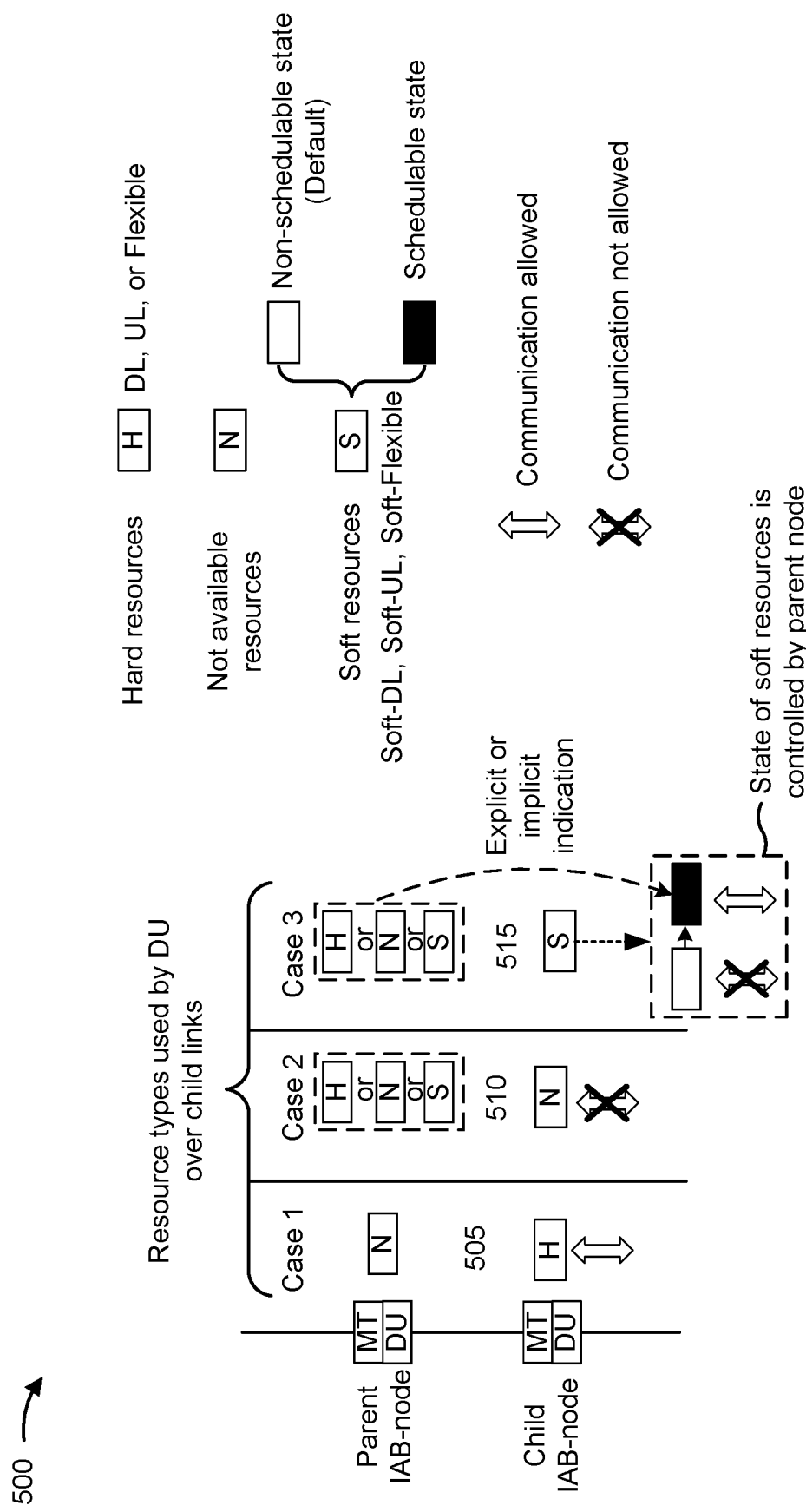
FIG. 5 is a diagram illustrating an example of resource types in an IAB network, in accordance with the present disclosure.

FIG. 5 is a diagram illustrating an example 500 of resource types in an IAB network, in accordance with the present disclosure. In an IAB network, time domain resources (sometimes referred to as time resources) may be configured as downlink-only, uplink-only, flexible, or not available (e.g., unavailable). When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Examples of downlink communications include synchronization signal blocks (SSBs), channel state information reference signals (CSI-RS), physical downlink control channel (PDCCH) communications, and/or physical downlink shared channel (PDSCH) communications. Examples of uplink communications include physical random access channel (PRACH) communications, physical uplink control channel (PUCCH) communications, physical uplink shared channel (PUSCH) communications, and/or sounding reference signals (SRSs).

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node. For example, the parent node may indicate (e.g., explicitly or implicitly) whether a soft time resource is available for communications of the wireless node. Thus, a soft time resource may be in one of two states: a schedulable state (e.g., when the soft time resource is available for scheduling and/or communications of the wireless node) and a non-schedulable state (e.g., when the soft time resource is not available for scheduling and is not available for communications of the wireless node).

For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

As an example, and as shown by reference number 505, a time resource may be configured as hard for a child node, and may be configured as not available for a parent node of the child node. In this case, the parent node cannot communicate using that time resource, but the child node can schedule communications in that time resource and/or communicate using that time resource. This configuration may reduce interference between the parent node and the child node and/or may reduce scheduling conflicts between the parent node and the child node.

As another example, and as shown by reference number 510, a time resource may be configured as not available for the child node, and may be configured as hard, soft, or not available for the parent node (e.g., depending on a network configuration, network conditions, and/or a configuration of a parent node of the parent node). In this case, the child node cannot schedule communications in that time resource and cannot communicate using that time resource.

As another example, and as shown by reference number 515, a time resource may be configured as soft for the child node, and may be configured as hard, soft, or not available for the parent node (e.g., depending on a network configuration, network conditions, and/or a configuration of a parent node of the parent node). In this case, the child node cannot schedule or communicate using the time resource unless the child node receives an indication (e.g., a release indication), from the parent node (e.g., explicitly or implicitly), that the time resource is available (i.e., released) for use by the child node. If the child node receives such an indication, then the child node can schedule communications in that time resource and/or communicate using that time resource.

In an IAB network, parent nodes may periodically broadcast an SIB in a SIB Type 1 (SIB1) message. Child nodes may receive these SIB1 messages, both from the parent nodes for those child nodes as well as from neighboring cells served by other parent nodes. The SIB1 messages may include basic TDD information, such as a TDD-UL-DL-ConfigCommon data structure as defined in 3GPP specifications and/or another standard. This basic TDD information may define a periodic pattern of downlink and uplink slots for reception and transmission. However, this basic TDD information often lacks downlink and uplink indicators for at least one slot used within the intended TDD configuration. Additionally, this basic TDD information included in SIB1 messages often lacks indicators of availability of symbols within slots (e.g., as described above). As used herein, "slot" may refer to a portion of a subframe, which in turn may be a fraction of a radio frame within an LTE, 5G, or other wireless communication structure. In some aspects, a slot may include one or more symbols. Additionally, "symbol" may refer to an OFDM symbol or another similar symbol within a slot.

In addition, some slot formats, which may be used by the nodes, are not compatible with intended TDD configuration signaling using a cross-link interference (CLI) framework. For example, a format of an intended TDD configuration message may not allow an indication of slot formats that includes:

[$N_1$ UL symbols, $N_2$ flexible (F) symbols, $N_3$ DL symbols], where $N_1$, $N_2$, and $N_3$ are positive integers and where $N_1$, $N_2$, and $N_2$ are quantities of symbols in an ordered set of symbols. In other words, an intended TDD configuration message may not enable indication of a slot format that includes a first quantity of uplink symbols, followed by a second quantity of flexible symbols, followed by a third quantity of downlink symbols.

Moreover, some other types of slot formats may not be supported in an intended TDD configuration message, such as when $N_1>0$, $N_2=0$, and $N_3>0$; when $N_1>0$, $N_2>0$, and $N_3=0$; when $N_1=0$, $N_2>0$, and $N_3>0$; and so on. Some slot formats that cannot be indicated using an intended TDD configuration message may be indicated using a TDD dedicated configuration message or a slot format indicator (SFI). However, using an SFI or a TDD dedicated configuration message does not allow for dynamic configuration to reduce CLI.

Techniques and apparatuses described herein define a broadcast of more detailed TDD information from parent nodes for reception by child nodes of neighboring cells. For example, techniques and apparatuses described herein may use a TDD-UL-DL-ConfigDedicated data structure as defined in 3GPP specifications and/or another standard. Additionally, or alternatively, techniques and apparatuses described herein may include, in the broadcast, indicators of availability of symbols within at least one slot used within the intended TDD configuration. As a result, the nodes may manage interference more effectively, which increases quality and/or reliability of communications, increases throughput, and/or reduces latency. Additionally, the broadcasts described herein are faster and consume fewer processing and network resources as compared with exchanging information through CUs.

As indicated above, FIG. 5 is provided as an example. Other examples are possible and may differ from what was described with regard to FIG. 5.

Figure 6:
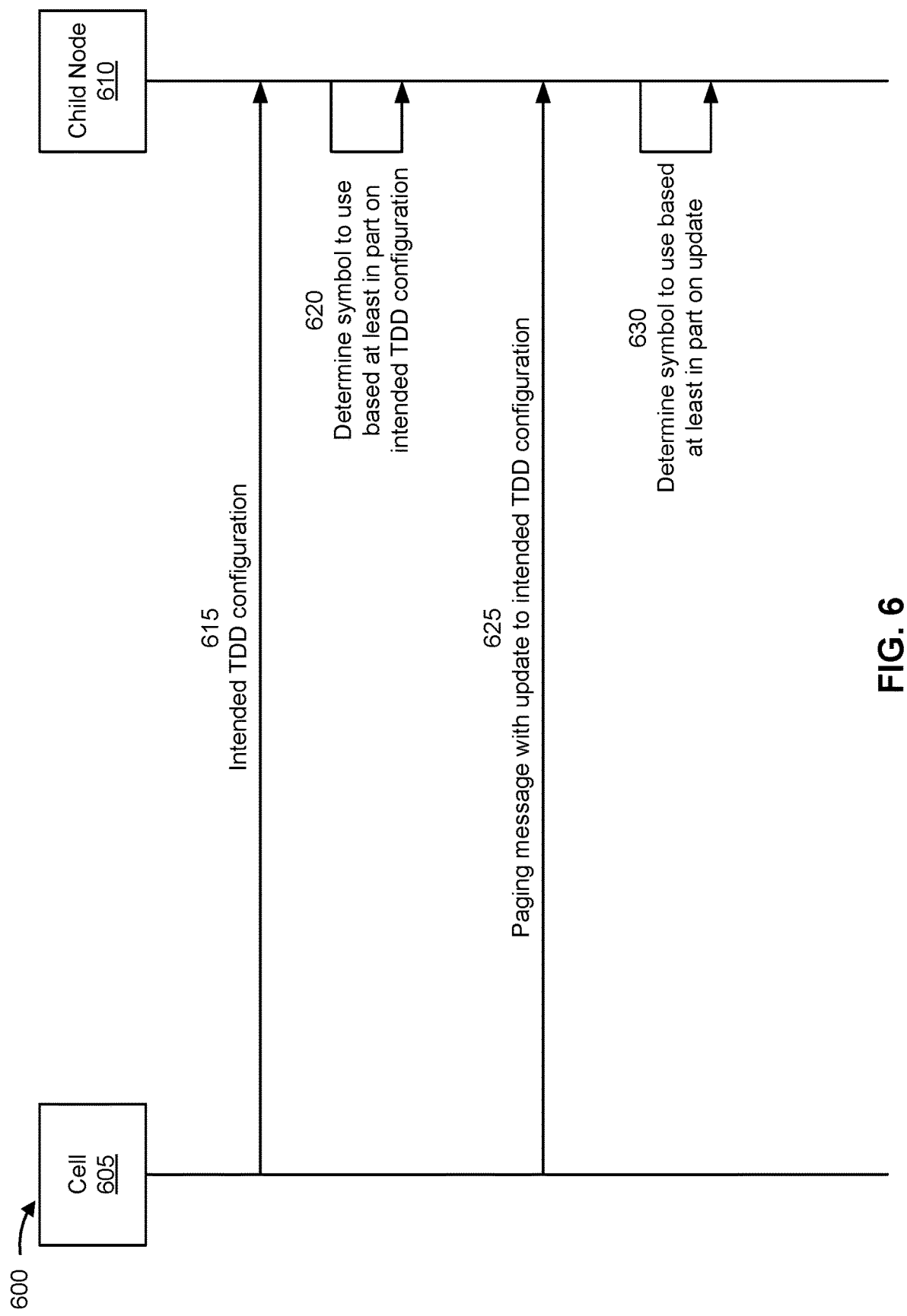
FIG. 6 is a diagram illustrating an example associated with broadcasting time division duplex (TDD) configurations, in accordance with the present disclosure.

FIG. 6 is a diagram illustrating an example 600 of broadcasting intended TDD configurations, in accordance with the present disclosure. As shown in FIG. 6, a cell 605 (e.g., served by a DU in an IAB network, such as a DU of IAB node 410 of FIG. 4, and/or another network node) may communicate with a child node 610 (e.g., a DU in an IAB network, such as a DU of IAB node 410 of FIG. 4; an MT in an IAB network, such as an MT of IAB node 410 of FIG. 4; and/or another child node). The cell 605 may be a cell neighboring a cell served by the child node 610. Additionally, or alternatively, the cell 605 may be a serving cell of child node 610 (e.g., served by a parent DU of a child DU in an IAB network, such as a DU of IAB node 410 of FIG. 4, and/or another network node).

The cell 605 may generate a message to include an indication of an intended TDD configuration for a parent node of the cell 605. In some aspects, the indication may include downlink and uplink indicators for at least one slot used within the intended TDD configuration. For example, the indication may be a TDD-UL-DL-ConfigDedicated data structure as defined in 3GPP specifications and/or another standard. Although the description below will focus on at least one slot used within the intended TDD configuration, the description similarly applies to any quantity of slots used within the intended TDD configuration (e.g., by providing an index within the data structure to link different downlink and uplink indicators to different slots).

In some aspects, the indication may include, for the at least one slot used within the intended TDD configuration, information indicating a quantity of downlink symbols and a quantity of uplink symbols. For example, the indication may comprise a first integer (e.g., from 0 to 13 or another range) indicating a quantity of downlink symbols at the beginning of the at least one slot and a second integer (e.g., from 0 to 13 or another range) indicating a quantity of uplink symbols at the end of the at least one slot. As an alternative, the first integer may indicate a quantity of downlink symbols at the end of the at least one slot, and the second integer may indicate a quantity of uplink symbols at the beginning of the at least one slot.

Additionally, or alternatively, the indication may include, for the at least one slot used within the intended TDD configuration, an implicit indicator of a quantity of flexible symbols. In some aspects, the at least one slot may include flexible symbols if the quantity of uplink symbols and the quantity of downlink symbols sum to a total less than a quantity of symbols in the at least one slot. For example, if the quantity of uplink symbols and the quantity of downlink symbols sum to a total less than 14 or other quantity of symbols in the at least one slot, the indication may implicitly indicate that the remaining quantity of symbols in the at least one slot are flexible. As an alternative, the indication may include an explicit indicator of a quantity of flexible symbols, such as an integer indicating a quantity of flexible symbols in the middle of the at least one slot (e.g., between uplink and downlink symbols).

Additionally, or alternatively, the indication may include, for the at least one slot used within the intended TDD configuration, an indicator of a permutation of the downlink and uplink indicators. For example, the indicator may include a bit, a Boolean, or other data type that determines whether downlink symbols precede uplink symbols in the at least one slot or whether uplink symbols precede downlink symbols in the at least one slot. In some aspects, one option (e.g., downlink symbols preceding uplink symbols) may serve as a default, and the indicator may be present only when the other option (e.g., uplink symbols preceding downlink symbols) is used within the at least one slot.

Additionally, or alternatively, the indication may include, for the at least one slot used within the intended TDD configuration, indicators of availability of symbols within the at least one slot. For example, the indicators may include bits, Booleans, or other data types that indicate whether a symbol within the at least one slot is available or unavailable to the cell 605. In some aspects, the indicators may further indicate whether the symbol is hard or soft, as described above in connection with FIG. 5. In some aspects, all uplink symbols in the at least one slot may share the same availability, all downlink symbols in the at least one slot may share the same availability, and/or all flexible symbols in the at least one slot may share the same availability.

As shown by reference number 615, the cell 605 may transmit the message including the indication of the intended TDD configuration for the parent node. In some aspects, the message may be included in a SIB message. For example, the cell 605 may broadcast the SIB message on an on-demand basis.

Additionally, or alternatively, the message may be included in DCI. In some aspects, the DCI may be a group-common DCI sent to a set of wireless devices including the child node 610. Additionally, in some aspects, the group-common DCI may indicate an SFI corresponding to the intended TDD configuration. The DCI may be broadcast by the cell 605 and/or may be directed to one or more MT nodes (e.g., the child node 610).

As further shown by reference number 615, the child node 610 may receive the message, from the cell 605, that includes the indication of the intended TDD configuration for the cell 605 (whether a neighboring cell or a serving cell). The indication may include downlink and uplink indicators for at least one slot used within the intended TDD configuration, as described above.

As shown by reference number 620, the child node 610 may determine a symbol to use, within a TDD configuration for the child node 610, based at least in part on receiving the message. For example, the child node 610 may determine the symbol based at least in part on managing interference between a TDD configuration for the child node 610 and the intended TDD configuration for the cell 605. As described above, managing interference may include selecting symbols for uplink and/or downlink that are not used by other child nodes as indicated in the intended TDD configuration and/or using flexible symbols for uplink and/or downlink based at least in part on how other child nodes are using the flexible symbols as indicated in the intended TDD configuration.

As described above, the cell 605 may comprise a serving cell of the child node 610. Accordingly, the cell 605 may additionally or alternatively transmit, to the child node 610, at least one of a cell-specific TDD configuration, a dedicated TDD configuration, an SFI, or a combination thereof. For example, the cell 605 may comprise a parent DU of the child node 610 that provides the cell-specific TDD configuration, the dedicated TDD configuration, the SFI, or a combination thereof for use by the child node 610. In some aspects, the child node 610 may determine the symbol to use based at least in part on the at least one of a cell-specific TDD configuration, a dedicated TDD configuration, an SFI, or a combination thereof. For example, the child node 610 may manage interference between the intended TDD configuration and the cell-specific TDD configuration, the dedicated TDD configuration, the SFI, or a combination thereof.

In some aspects, the cell 605 may modify the intended TDD configuration. For example, the cell 605 may modify a number of uplink and/or downlink symbols within the at least one slot, change a flexible symbol within the at least one slot to an uplink or downlink symbol, and/or modify an availability of a symbol within the at least one slot. Accordingly, the cell 605 may generate a paging message indicating a change to the intended TDD configuration.

As shown by reference number 625, the cell 605 may transmit the paging message indicating the change to the intended TDD configuration. For example, the cell 605 may broadcast the paging message on an on-demand basis and/or direct the paging message to one or more MT nodes, as described above.

As further shown by reference number 625, the child node 610 may receive the paging message indicating the change to the intended TDD configuration. For example, the child node 610 may decode the paging message when broadcast and/or request the paging message from the cell 605.

As shown by reference number 630, the child node 610 may redetermine the symbol to use based at least in part on receiving the paging message. For example, as described above, the child node 610 may determine the symbol based at least in part on managing interference between the TDD configuration for the child node 610 and the intended TDD configuration for the cell 605 with the change indicated in the paging message. As described above, managing interference may include selecting symbols for uplink and/or downlink that are not used by other child nodes as indicated in the intended TDD configuration and/or using flexible symbols for uplink and/or downlink based at least in part on how other child nodes are using the flexible symbols as indicated in the intended TDD configuration.

As indicated above, FIG. 6 is provided as an example. Other examples are possible and may differ from what was described with regard to FIG. 6.

Figure 7:
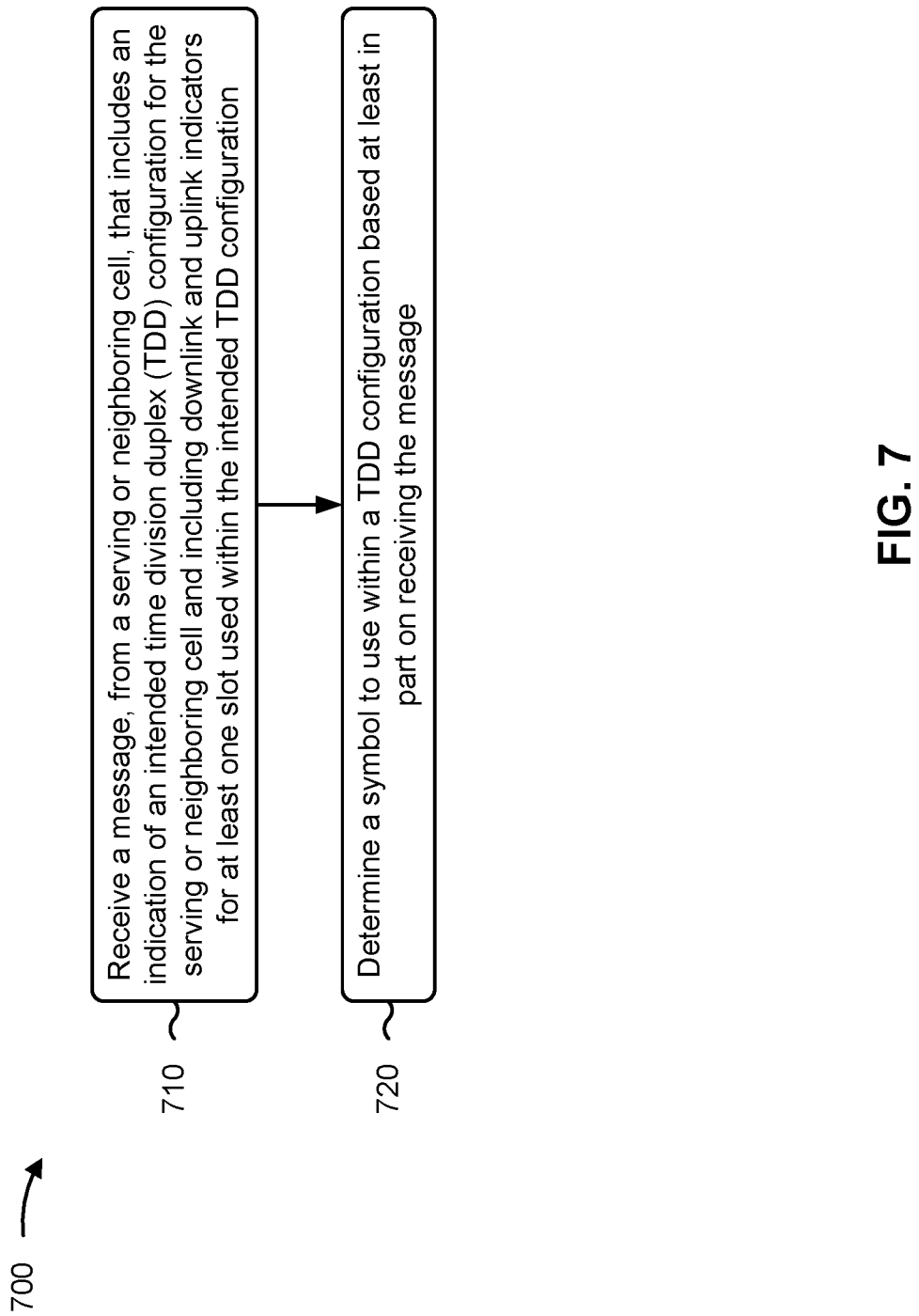
FIG. 7 is a diagram illustrating an example process performed by a child node, in accordance with the present disclosure.

FIG. 7 is a diagram illustrating an example process 700 performed, for example, by a child node, in accordance with the present disclosure. Example process 700 is an example where the child node (e.g., child node 610 of FIG. 6) performs operations associated with broadcasting intended TDD configurations.

As shown in FIG. 7, in some aspects, process 700 may include receiving a message, from a serving or neighboring cell (e.g., cell 605 of FIG. 6), that includes an indication of an intended TDD configuration for the serving or neighboring cell (block 710). For example, the child node (e.g., using antenna 234, demodulator 232, MIMO detector 236, receive processor 238, controller/processor 240, memory 242, and/or scheduler 246) may receive the message, from the serving or neighboring cell, that includes the indication of the intended TDD configuration for the serving or neighboring cell, as described above. In some aspects, the indication includes downlink and uplink indicators for at least one slot used within the intended TDD configuration.

As further shown in FIG. 7, in some aspects, process 700 may include determining a symbol to use within a TDD configuration for the child node, based at least in part on receiving the message (block 720). For example, the child node (e.g., using transmit processor 220, TX MIMO processor 230, MIMO detector 236, receive processor 238, controller/processor 240, memory 242, and/or scheduler 246) may determine a symbol to use within a TDD configuration for the child node, based at least in part on receiving the message, as described above.

Process 700 may include additional aspects, such as any single aspect or any combination of aspects described below and/or in connection with one or more other processes described elsewhere herein.

In a first aspect, determining the symbol is based at least in part on managing interference between the TDD configuration for the child node and the intended TDD configuration for the serving or neighboring cell.

In a second aspect, alone or in combination with the first aspect, the indication includes, for the at least one slot used within the intended TDD configuration, information indicating a quantity of downlink symbols and a quantity of uplink symbols.

In a third aspect, alone or in combination with one or more of the first and second aspects, the indication includes, for the at least one slot used within the intended TDD configuration, an implicit indicator of a quantity of flexible symbols.

In a fourth aspect, alone or in combination with one or more of the first through third aspects, the indication includes, for the at least one slot used within the intended TDD configuration, an indicator of a permutation of the downlink and uplink indicators.

In a fifth aspect, alone or in combination with one or more of the first through fourth aspects, the indication includes, for the at least one slot used within the intended TDD configuration, indicators of availability of symbols within the at least one slot.

In a sixth aspect, alone or in combination with one or more of the first through fifth aspects, the message is included in a SIB.

In a seventh aspect, alone or in combination with one or more of the first through sixth aspects, the message is included in DCI.

In an eighth aspect, alone or in combination with one or more of the first through seventh aspects, the DCI is a group-common DCI sent to a set of wireless devices including the child node.

In a ninth aspect, alone or in combination with one or more of the first through eighth aspects, the group-common DCI indicates an SFI corresponding to the intended TDD configuration.

In a tenth aspect, alone or in combination with one or more of the first through ninth aspects, process 700 further includes receiving (e.g., using antenna 234, demodulator 232, MIMO detector 236, receive processor 238, controller/processor 240, memory 242, and/or scheduler 246) a paging message indicating a change to the intended TDD configuration; and determining (e.g., using transmit processor 220, TX MIMO processor 230, MIMO detector 236, receive processor 238, controller/processor 240, memory 242, and/or scheduler 246) the symbol to use based at least in part on receiving the paging message.

In an eleventh aspect, alone or in combination with one or more of the first through tenth aspects, the message is received from a DU in an IAB network.

In a twelfth aspect, alone or in combination with one or more of the first through eleventh aspects, the serving or neighboring cell comprises a serving cell of the child node, and the intended TDD configuration includes at least one of a cell-specific TDD configuration, a dedicated TDD configuration, an SFI, or a combination thereof.

In a thirteenth aspect, alone or in combination with one or more of the first through twelfth aspects, the symbol to use is determined based at least in part on the at least one of a cell-specific TDD configuration, a dedicated TDD configuration, an SFI, or a combination thereof.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
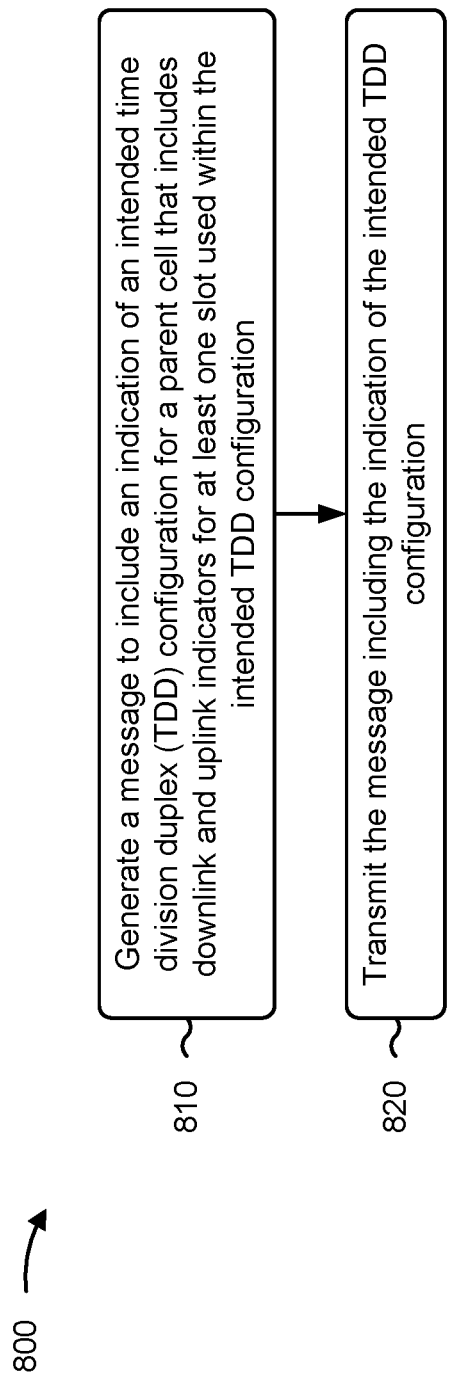
FIG. 8 is a diagram illustrating an example process performed by a parent node, in accordance with the present disclosure.

FIG. 8 is a diagram illustrating an example process 800 performed, for example, by a parent node, in accordance with the present disclosure. Example process 800 is an example where a parent node (e.g., a parent node serving cell 605 of FIG. 6) performs operations associated with broadcasting intended TDD configurations.

As shown in FIG. 8, in some aspects, process 800 may include generating a message to include an indication of an intended TDD configuration for the parent node (block 810). For example, the parent node (e.g., using transmit processor 220, TX MIMO processor 230, modulator 232, controller/processor 240, memory 242, and/or scheduler 246) may generate the message to include the indication of the intended TDD configuration for the parent node, as described above. In some aspects, the indication includes downlink and uplink indicators for at least one slot used within the intended TDD configuration.

As further shown in FIG. 8, in some aspects, process 800 may include transmitting the message including the indication of the intended TDD configuration for the parent node (block 820). For example, the parent node (e.g., using transmit processor 220, TX MIMO processor 230, modulator 232, antenna 234, controller/processor 240, memory 242, and/or scheduler 246) may transmit the message including the indication of the intended TDD configuration for the parent node, as described above.

Process 800 may include additional aspects, such as any single aspect or any combination of aspects described below and/or in connection with one or more other processes described elsewhere herein.

In a first aspect, the indication includes, for the at least one slot used within the intended TDD configuration, information indicating a quantity of downlink symbols and a quantity of uplink symbols.

In a second aspect, alone or in combination with the first aspect, the indication includes, for the at least one slot used within the intended TDD configuration, an implicit indicator of a quantity of flexible symbols.

In a third aspect, alone or in combination with one or more of the first and second aspects, the indication includes, for the at least one slot used within the intended TDD configuration, an indicator of a permutation of the downlink and uplink indicators.

In a fourth aspect, alone or in combination with one or more of the first through third aspects, the indication includes, for the at least one slot used within the intended TDD configuration, indicators of availability of symbols within the at least one slot.

In a fifth aspect, alone or in combination with one or more of the first through fourth aspects, transmitting the message includes broadcasting the message as a SIB message.

In a sixth aspect, alone or in combination with one or more of the first through fifth aspects, the SIB message is broadcast on an on-demand basis.

In a seventh aspect, alone or in combination with one or more of the first through sixth aspects, transmitting the message includes sending the message as DCI.

In an eighth aspect, alone or in combination with one or more of the first through seventh aspects, the DCI is a group-common DCI sent to a set of wireless devices including a child node.

In a ninth aspect, alone or in combination with one or more of the first through eighth aspects, the group-common DCI indicates an SFI corresponding to the intended TDD configuration.

In a tenth aspect, alone or in combination with one or more of the first through ninth aspects, the DCI is directed to one or more MT nodes.

In an eleventh aspect, alone or in combination with one or more of the first through tenth aspects, process 800 further includes generating a paging message (e.g., using transmit processor 220, TX MIMO processor 230, modulator 232, controller/processor 240, memory 242, and/or scheduler 246) indicating a change to the intended TDD configuration; and transmitting (e.g., using transmit processor 220, TX MIMO processor 230, modulator 232, antenna 234, controller/processor 240, memory 242, and/or scheduler 246) the paging message indicating the change to the intended TDD configuration.

In a twelfth aspect, alone or in combination with one or more of the first through eleventh aspects, the paging message is broadcast on an on-demand basis or directed to one or more MT nodes.

In a thirteenth aspect, alone or in combination with one or more of the first through twelfth aspects, the parent node is at least part of a serving cell, and the intended TDD configuration includes at least one of a cell-specific TDD configuration, a dedicated TDD configuration, an SFI, or a combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a child node, comprising: receiving a message, from a serving or neighboring cell, that includes an indication of an intended time division duplex (TDD) configuration for the serving or neighboring cell, wherein the indication includes downlink and uplink indicators for at least one slot used within the intended TDD configuration; and determining a symbol to use within a TDD configuration for the child node, based at least in part on receiving the message.

Aspect 2: The method of Aspect 1, wherein determining the symbol is based at least in part on managing interference between the TDD configuration for the child node and the intended TDD configuration for the serving or neighboring cell.

Aspect 3: The method of any one of Aspects 1 through 2, wherein the indication includes, for the at least one slot used within the intended TDD configuration, information indicating a quantity of downlink symbols and a quantity of uplink symbols.

Aspect 4: The method of any one of Aspects 1 through 3, wherein the indication includes, for the at least one slot used within the intended TDD configuration, an implicit indicator of a quantity of flexible symbols.

Aspect 5: The method of any one of Aspects 1 through 4, wherein the indication includes, for the at least one slot used within the intended TDD configuration, an indicator of a permutation of the downlink and uplink indicators.

Aspect 6: The method of any one of Aspects 1 through 5, wherein the indication includes, for the at least one slot used within the intended TDD configuration, indicators of availability of symbols within the at least one slot.

Aspect 7: The method of any one of Aspects 1 through 6, wherein the message is included in a system information block (SIB).

Aspect 8: The method of any one of Aspects 1 through 6, wherein the message is included in downlink control information (DCI).

Aspect 9: The method of Aspect 8, wherein the DCI is a group-common DCI sent to a set of wireless devices including the child node.

Aspect 10: The method of Aspect 9, wherein the group-common DCI indicates a slot format indication (SFI) corresponding to the intended TDD configuration.

Aspect 11: The method of any one of Aspects 1 through 10, further comprising: receiving a paging message indicating a change to the intended TDD configuration; and determining the symbol to use based at least in part on receiving the paging message.

Aspect 12: The method of any one of Aspects 1 through 11, wherein the message is received from a distributed unit (DU) in an integrated access and backhaul (IAB) network.

Aspect 13: The method of any one of Aspects 1 through 12, wherein the serving or neighboring cell comprises a serving cell of the child node, and the intended TDD configuration includes at least one of a cell-specific TDD configuration, a dedicated TDD configuration, a slot format indication (SFI), or a combination thereof.

Aspect 14: The method of Aspect 13, wherein the symbol to use is determined based at least in part on the at least one of a cell-specific TDD configuration, a dedicated TDD configuration, an SFI, or a combination thereof.

Aspect 15: A method of wireless communication performed by a parent node, comprising: generating a message to include an indication of an intended time division duplex (TDD) configuration for the parent node, wherein the indication includes downlink and uplink indicators for at least one slot used within the intended TDD configuration; and transmitting the message including the indication of the intended TDD configuration for the parent node.

Aspect 16: The method of Aspect 15, wherein the indication includes, for the at least one slot used within the intended TDD configuration, information indicating a quantity of downlink symbols and a quantity of uplink symbols.

Aspect 17: The method of any one of Aspects 15 through 16, wherein the indication includes, for the at least one slot used within the intended TDD configuration, an implicit indicator of a quantity of flexible symbols.

Aspect 18: The method of any one of Aspects 15 through 17, wherein the indication includes, for the at least one slot used within the intended TDD configuration, an indicator of a permutation of the downlink and uplink indicators.

Aspect 19: The method of any one of Aspects 15 through 18, wherein the indication includes, for the at least one slot used within the intended TDD configuration, indicators of availability of symbols within the at least one slot.

Aspect 20: The method of any one of Aspects 15 through 19, wherein transmitting the message comprises: broadcasting the message as a system information block (SIB) message.

Aspect 21: The method of Aspect 20, wherein the SIB message is broadcast on an on-demand basis.

Aspect 22: The method of any one of Aspects 15 through 19, wherein transmitting the message comprises: sending the message as downlink control information (DCI).

Aspect 23: The method of Aspect 22, wherein the DCI is a group-common DCI sent to a set of wireless devices including a child node.

Aspect 24: The method of Aspect 23, wherein the group-common DCI indicates a slot format indication (SFI) corresponding to the intended TDD configuration.

Aspect 25: The method of Aspect 22, wherein the DCI is directed to one or more mobile termination (MT) nodes.

Aspect 26: The method of any one of Aspects 15 through 25, further comprising: generating a paging message indicating a change to the intended TDD configuration; and transmitting the paging message indicating the change to the intended TDD configuration.

Aspect 27: The method of Aspect 26, wherein the paging message is broadcast on an on-demand basis or directed to one or more MT nodes.

Aspect 28: The method of any one of Aspects 15 through 27, wherein the parent node is at least part of a serving cell, and the intended TDD configuration includes at least one of a cell-specific TDD configuration, a dedicated TDD configuration, a slot format indication (SFI), or a combination thereof.

Aspect 29: An apparatus for wireless communication at a device, comprising a processor; memory coupled with the processor; and instructions stored in the memory and executable by the processor to cause the apparatus to perform the method of one or more Aspects of Aspects 1-14.

Aspect 30: A device for wireless communication, comprising a memory and one or more processors coupled to the memory, the memory and the one or more processors configured to perform the method of one or more Aspects of Aspects 1-14.

Aspect 31: An apparatus for wireless communication, comprising at least one means for performing the method of one or more Aspects of Aspects 1-14.

Aspect 32: A non-transitory computer-readable medium storing code for wireless communication, the code comprising instructions executable by a processor to perform the method of one or more Aspects of Aspects 1-14.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 1-14.

Aspect 34: An apparatus for wireless communication at a device, comprising a processor; memory coupled with the processor; and instructions stored in the memory and executable by the processor to cause the apparatus to perform the method of one or more Aspects of Aspects 15-28.

Aspect 35: A device for wireless communication, comprising a memory and one or more processors coupled to the memory, the memory and the one or more processors configured to perform the method of one or more Aspects of Aspects 15-28.

Aspect 36: An apparatus for wireless communication, comprising at least one means for performing the method of one or more Aspects of Aspects 15-28.

Aspect 37: A non-transitory computer-readable medium storing code for wireless communication, the code comprising instructions executable by a processor to perform the method of one or more Aspects of Aspects 15-28.

Aspect 38: A non-transitory computer-readable medium storing a set of instructions for wireless communication, the set of instructions comprising one or more instructions that, when executed by one or more processors of a device, cause the device to perform the method of one or more Aspects of Aspects 15-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A child node for wireless communication, comprising:
a memory; and
one or more processors coupled to the memory, the one or more processors configured to cause the child node to:
receive a message, from a serving or neighboring cell, that includes an indication of an intended time division duplex (TDD) configuration for the serving or neighboring cell, wherein the indication includes downlink and uplink indicators and indicators of availability of symbols for at least one slot used within the intended TDD configuration; and
determine a symbol to use within a TDD configuration for the child node, based at least in part on the indicators of availability of symbols in the message, wherein the child node is an integrated access and backhaul (TAB) node of an IAB network, and wherein the TDD configuration for the child node is different than the intended TDD configuration for the serving or neighboring cell.

2. The child node of claim 1, wherein determining the symbol is based at least in part on managing interference between the TDD configuration for the child node and the intended TDD configuration for the serving or neighboring cell.

3. The child node of claim 1, wherein the indication includes, for the at least one slot used within the intended TDD configuration, information indicating a quantity of downlink symbols and a quantity of uplink symbols.

4. The child node of claim 1, wherein the indication includes, for the at least one slot used within the intended TDD configuration, an implicit indicator of a quantity of flexible symbols.

5. The child node of claim 1, wherein the indication includes, for the at least one slot used within the intended TDD configuration, an indicator of a permutation of the downlink and uplink indicators.

6. The child node of claim 1, wherein the message is included in a system information block (SIB).

7. The child node of claim 1, wherein the message is included in downlink control information (DCI).

8. The child node of claim 7, wherein the DCI is a group-common DCI sent to a set of wireless devices including the child node.

9. The child node of claim 8, wherein the group-common DCI indicates a slot format indication (SFI) corresponding to the intended TDD configuration.

10. The child node of claim 1, wherein the one or more processors are further configured to cause the child node to:
receive a paging message indicating a change to the intended TDD configuration; and
determine the symbol to use based at least in part on receiving the paging message.

11. The child node of claim 1, wherein the one or more processors, to receive the message, are configured to cause the child node to:
receive the message from a distributed unit (DU) in the IAB network.

12. The child node of claim 1, wherein the serving or neighboring cell comprises a serving cell of the child node, and wherein the intended TDD configuration comprises at least one of a cell-specific TDD configuration, a dedicated TDD configuration, a slot format indication (SFI), or a combination thereof.

13. The child node of claim 12, wherein the one or more processors, to determine the symbol to use, are configured to cause the child node to:
determine the symbol to use based at least in part on the at least one of a cell-specific TDD configuration, a dedicated TDD configuration, an SFI, or a combination thereof.

14. A parent node for wireless communication, comprising:
a memory; and
one or more processors coupled to the memory, the one or more processors configured to cause the parent node to:
generate a message to include an indication of an intended time division duplex (TDD) configuration for the parent node, wherein the indication includes downlink and uplink indicators and indicators of availability of symbols for at least one slot used within the intended TDD configuration; and
transmit, to another node, the message including the indication of the intended TDD configuration for the parent node, wherein the parent node is an integrated access and backhaul (IAB) node of an IAB network, and wherein a TDD configuration for the other node is different than the intended TDD configuration for the parent node.

15. The parent node of claim 14, wherein the indication includes, for the at least one slot used within the intended TDD configuration, information indicating a quantity of downlink symbols and a quantity of uplink symbols.

16. The parent node of claim 14, wherein the indication includes, for the at least one slot used within the intended TDD configuration, an implicit indicator of a quantity of flexible symbols.

17. The parent node of claim 14, wherein the indication includes, for the at least one slot used within the intended TDD configuration, an indicator of a permutation of the downlink and uplink indicators.

18. The parent node of claim 14, wherein the one or more processors, to transmit the message, are configured to cause the parent node to:
broadcast the message as a system information block (SIB) message.

19. The parent node of claim 18, wherein the one or more processors, to broadcast the SIB message, are configured to cause the parent node to:
broadcast the SIB message on an on-demand basis.

20. The parent node of claim 14, wherein the one or more processors, to transmit the message, are configured to cause the parent node to:
send the message as downlink control information (DCI).

21. The parent node of claim 20, wherein the DCI is a group-common DCI sent to a set of wireless devices including the other node, and wherein the other node comprises a child node.

22. The parent node of claim 21, wherein the group-common DCI indicates a slot format indication (SFI) corresponding to the intended TDD configuration.

23. The parent node of claim 20, wherein the DCI is directed to one or more mobile termination (MT) nodes including the other node.

24. The parent node of claim 14, wherein the one or more processors are further configured to cause the parent node to:
generate a paging message indicating a change to the intended TDD configuration; and transmit the paging message indicating the change to the intended TDD configuration.

25. The parent node of claim 24, wherein the one or more processors, to transmit the paging message, are configured to cause the parent node to:
broadcast the paging message on an on-demand basis or directed to one or more mobile termination (MT) nodes including the other node.

26. The parent node of claim 14, wherein the parent node is at least part of a serving cell, and wherein the intended TDD configuration comprises at least one of a cell-specific TDD configuration, a dedicated TDD configuration, a slot format indication (SFI), or a combination thereof.

27. A method of wireless communication performed by a child node, comprising:
receiving a message, from a serving or neighboring cell, that includes an indication of an intended time division duplex (TDD) configuration for the serving or neighboring cell, wherein the indication includes downlink and uplink indicators and indicators of availability of symbols for at least one slot used within the intended TDD configuration; and
determining a symbol to use within a TDD configuration for the child node, based at least in part on the indicators of availability of symbols in the message, wherein the child node is an integrated access and backhaul (IAB) node of an IAB network, and wherein the TDD configuration for the child node is different than the intended TDD configuration for the serving or neighboring cell.

28. The method of claim 27, wherein determining the symbol is based at least in part on managing interference between the TDD configuration for the child node and the intended TDD configuration for the serving or neighboring cell.

29. The method of claim 27, wherein the indication includes, for the at least one slot used within the intended TDD configuration, information indicating a quantity of downlink symbols and a quantity of uplink symbols.

30. A method of wireless communication performed by a parent node, comprising:
generating a message to include an indication of an intended time division duplex (TDD) configuration for the parent node, wherein the indication includes downlink and uplink indicators and indicators of availability of symbols for at least one slot used within the intended TDD configuration; and
transmitting, to another node, the message including the indication of the intended TDD configuration for the parent node, wherein the parent node is an integrated access and backhaul (IAB) node of an IAB network, and wherein a TDD configuration for the other node is different than the intended TDD configuration for the parent node.

* * * * *